United States Patent [19]

Liebl

[11] 3,949,221

[45] Apr. 6, 1976

[54] DOUBLE-FOCUSSING MASS SPECTROMETER

[75] Inventor: Helmuth Liebl, Eching, Germany

[73] Assignee: Max-Planck-Gesellschaft zur Forderung der Wissenschaften e.V., Gottingen, Germany

[22] Filed: Aug. 6, 1974

[21] Appl. No.: 495,248

[30] Foreign Application Priority Data

Aug. 9, 1973 Germany ............................ 2340372

[52] U.S. Cl. ............................ 250/281; 250/396 ML

[51] Int. Cl.[2] ............................ B01D 59/44

[58] Field of Search ........... 250/281, 282, 294, 298, 250/299, 396, 397, 283

[56] References Cited

UNITED STATES PATENTS

| | | | |
|---|---|---|---|
| 3,617,741 | 11/1971 | Siegbahn et al. | 250/281 X |
| 3,761,707 | 9/1973 | Liebl | 250/294 |

*Primary Examiner*—Davis L. Willis

*Attorney, Agent, or Firm*—William R. Woodward

[57] ABSTRACT

A double-focussing mass spectrometer having an electrostatic field energy analyser followed by a magnetic field momentum analyser. The entrance diaphragm is essentially annular and thus the entrance aperture of the spectrometer defines a hollow cone with its apex at the ion source. The number of ions received per second by such an aperture is significantly larger than for a conventional spectrometer entrance aperture.

10 Claims, 4 Drawing Figures

DOUBLE-FOCUSSING MASS SPECTROMETER

BACKGROUND OF THE INVENTION

This invention relates to a double-focussing mass spectrometer with a large entrance aperture.

Known mass spectrometers with focussing of direction and energy (referred to as "double-focussing" mass spectrometers) are able to admit only those ions which are emitted by the ion source in a small solid-angle range about the axis of entry of the mass spectrometer. In many applications this limitation is unimportant, especially when the ions under analysis can be accelerated to an energy which is high in comparison with their initial energy, since the paths of the accelerated particles take up only a small solid angle.

There are cases, however, in which the ions cannot be accelerated before their mass is analysed. If the ions are emitted by the ion source in a large solid angle, known mass spectrometers will accept only a very small proportion of particles (acceptance factor; ratio of the particles analysed by the mass spectrometer to the total number of particles emitted by the ion source). Assume, for example, an ion source with a small source volume, which emits a flow of $n_0$ ions per second into one hemisphere. Under these circumstances, in the emission distribution according to the cosine law, only the small fraction $dn/n_o = \alpha^2$ comes within the solid angle about the axis of entry of the mass spectrometer, which is given by a circular cone with the small aperture angle $\alpha$. If, however, a solid angle is considered which is limited by the wall of a hollow cone with a mean vertex angle $\phi$ and the same aperture angle $\alpha$, then $dn/n_o = 2 \sin 2\phi . \alpha$ particles are picked up by this hollow cone. $dn/n_o = 2\alpha$ results for $\phi = 45°$. This is more than in the first case by the factor $2/\alpha$, e.g. by the factor 50 for $\alpha$=2.3°.

A mass spectrometer capable of accepting the ions from a solid angle with the shape of a hollow cone would, therefore, have a considerably larger entrance aperture or "light intensity" than known mass spectrometers that are able to accept only particles from a circular cone with the aperture angle $\alpha$.

There are, of course, magnetic beta spectrometers ("Alpha-, Beta- and Gamma-Ray Spectroscopy," edited by Kai Siegbahn, 1965, North-Holland Publishing Company, Amsterdam, Volume 1, pages 126 to 135) and electrostatic electron-beam spectrometers (E. Blauth, Zeitung der Physik, Vol. 147 (1957), pages 228–240), in which the electrons emitted in the shell of a hollow cone are focussed on a detecting arrangement. Such electron-beam spectrometers are by their nature intended only for the energy analysis of a single type of particle, namely electrons, and are not suitable for analysing ions with various charge-to-mass ratios.

The problem of the present invention is the design of a double-focussing mass spectrometer with a large entrance aperture, hence a mass spectrometer with focussing of direction and energy, which has a large entrance aperture and, consequently, is able to absorb a high percentage of the particles which are emitted by an ion source within a large solid angle, e.g. in a hemisphere.

SUMMARY OF THE INVENTION

According to the present invention there is provided a double-focussing mass spectrometer with a large entrance aperture for an ion source emitting the ions under analysis within a large solid angle. The spectrometer has an entrance diaphragm, an electrical arrangement which forms an energy analyser and focusses ("direction focus") ions of equal energy, which are emitted by the ion source in various directions and pass through the entrance diaphragm at a given locus of points corresponding to their energy, a diaphragm ("energy diaphragm") arranged in the plane of these loci to limit the energy range covered, a magnetic arrangement which forms a momentum analyser and focusses ions with an equal charge-to-mass ratio, which have passed through the energy diaphragm, at a second given locus of points in a second plane in which an exit diaphragm is located, the position of the second loci relative to the aperture in the exist diaphragm being controllable, and an ion-detecting device to detect those ions which have passed through the exit diaphragm. A first novel feature lies in the fact that the entrance diaphragm, the energy diaphragm and the exit diaphragm are arranged in an essentially annular form and coaxially to one another. A second novel feature is that the electrical arrangement forming the electrical analyser is essentially rotationally symmetric relative to the axis of the diaphragms and deflects the pencil of ions entering the entrance diaphragm towards the axis in such a way that the centre beam of the deflected pencil of ions runs essentially parallel to the axis. A third novel feature is that between the energy diaphragm and the magnetic arrangement an electrical annular lens is arranged which makes parallel the divergent pencils of ions of equal energies emerging from the energy diaphragm. A fourth novel feature is that the magnetic arrangement forming the magnetic analyser is essentially axially symmetric, and a fifth is that the focal length of the annular lens is so selected that the energy dispersion of the electrical arrangement is opposite and equal to the energy dispersion of the assembly consisting of the annular lens and the magnetic arrangement.

One form of embodiment of the invention is characterised by the fact that the electrical arrangement contains a spherical capacitor which guides the ions entering the entrance diaphragm divergently on to paths running parallel to the axis and a second annular lens which focusses the guided ions in the first loci.

Another embodiment of the mass spectrometer is characterised by the fact that the electrical arrangement contains a cylindrical-mirror analyser which is so dimensioned that the ions entering the entrance diaphragm divergently are guided on to paths running essentially parallel to the axis and contains an annular lens which focusses the guided ions into the first loci.

The mass spectrometer may contain electrodes for accelerating the ions emitted by the ion source to an energy which is high in comparison to the energy of the ions emitted by the ion source and cylindrical-mirror analyser which the accelerated ions enter on approximately parallel paths and which is so dimensioned that it focusses the ions entering in parallel into the first loci in such a way that the centre beam runs essentially parallel to the axis.

The annular lenses may contain electrodes in the form of concentric straight circular cylinders.

At the ion exit end of the said cylindrical-mirror analyser, a coaxial electrode, short in an axial direction in comparison to said analyser, may be arranged, which is at least approximately aligned with the adjacent lens electrode and is connected to a source for a potential which lies between the potentials of the two main electrodes of the cylindrical-mirror analyser.

Preferably the magnetic arrangement contains wedge-shaped pole pieces with annular coils which produce an azimuthal magnetic field.

In a preferred mass spectrometer according to the invention, the ion-detecting device may contain an ion accelerator electrode, a secondary emission electrode in the form of a hollow cylinder, a rod-shaped scintillator element, which is arranged in its axis, coated with a thin conductive layer penetrable by secondary electrons and optically coupled to a photoelectric device, and a voltage source whose negative pole is connected to the secondary emission electrode in the form of a hollow cylinder and whose positive pole is connected to the conductive layer of the scintillator element.

Embodiments of the invention are described below in greater detail in connection with the accompanying drawings.

DETAILED DESCRIPTION OF THE PREFERRED EMBODIMENTS

Figure 1:
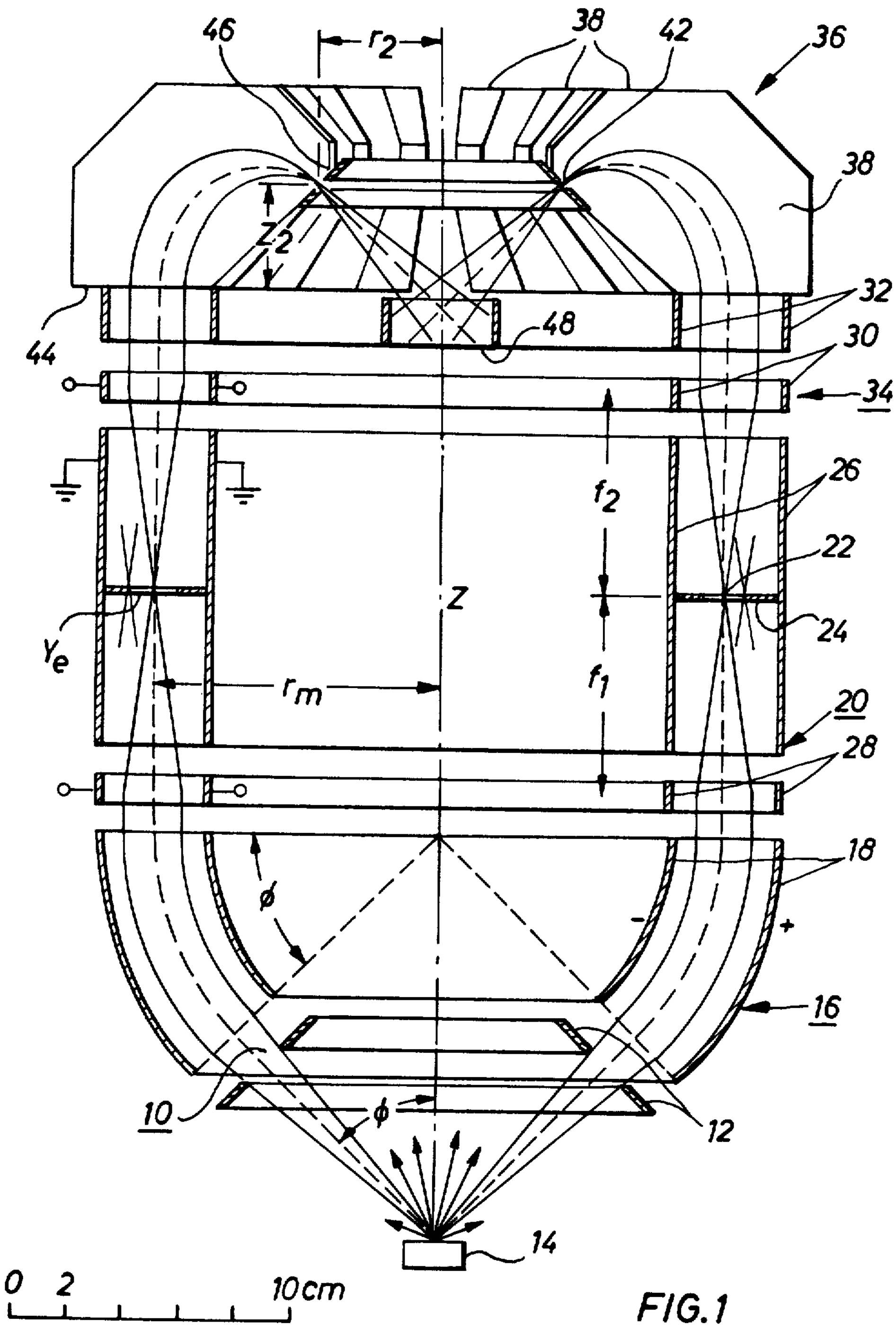
FIG. 1 is a schematic view of a first embodiment of a mass spectrometer according to the invention in axial section.

The mass spectrometer represented in FIG. 1 in axial section has an entrance diaphragm 10 formed by two metal rings 12 which take the form of two annular parts of a conical shell. In the direction of motion of the ions leaving an ion source 14, the entrance diaphragm 10 is followed by an electrical analyser 16 which here consists of a so-called spherical capacitor 18 with an electrostatic annular lens 20 connected thereafter. The spherical capacitor occupies a sector angle $\phi$ and its plates, which take the form of annular parts of concentric spherical surfaces, are so biassed that ions of a specific energy $eU_o$ issue parallel to a $z$ axis. The parallel ion beam is then focussed by the annular lens 20 into an annular focus 22, also referred to herein as a locus of points at a distance equal to its focal length. Ions of other energies are likewise focussed in the focal plane of the annular lens 20 and it is therefore possible to arrange in the plane of the annular focus 22 an annular diaphragm 24 which acts as an energy diaphragm and enables the energy range of the transmitted ions to be delimited.

The energy diaphragm 24 is arranged between two straight concentric cylindrical metal electrodes 26 which form, together with electrodes 28 that are short in the axial direction and are in alignment and, if necessary, the electrodes of the sperical condenser 18, the electrostatic lens field of the annual lens 20.

Figure 2:
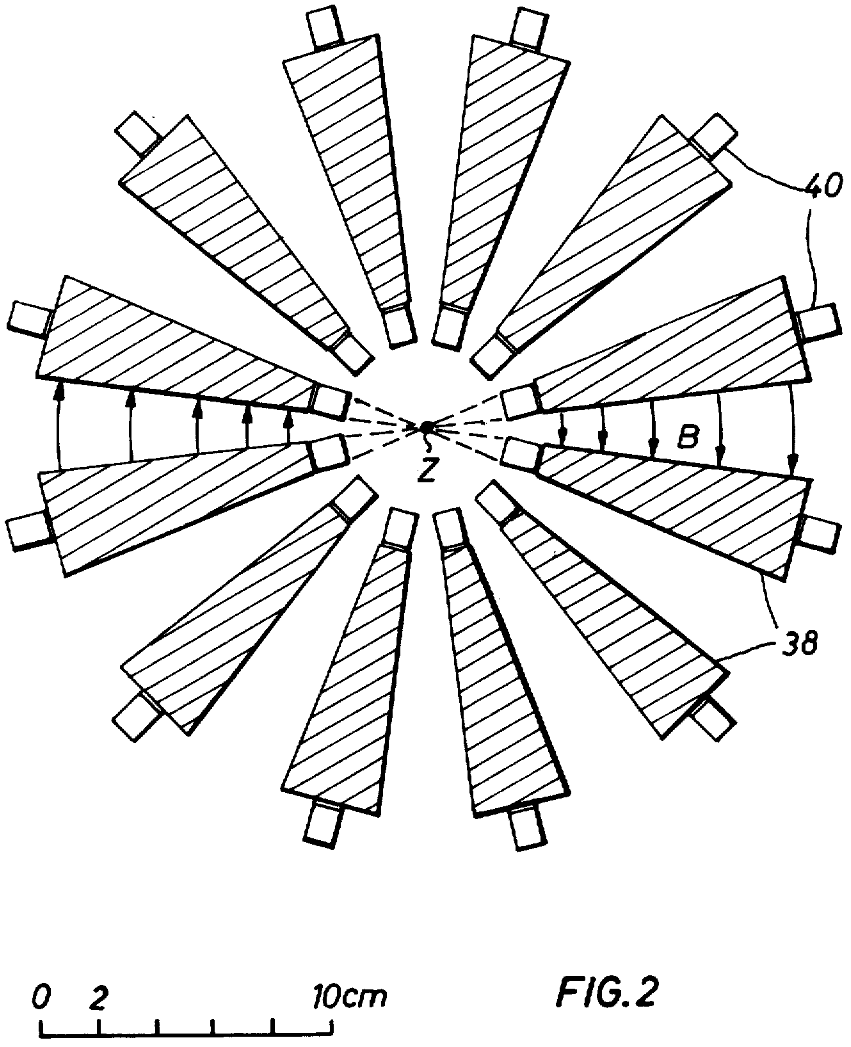
FIG. 2 is a cross section through a magnetic analyser for the mass spectrometer according to FIG. 1, in which the sectional plane runs perpendicular to the axis of the mass spectrometer.

The metal electrodes 26 are followed by two sets 30 and 32 of corresponding cylindrical electrodes which form with the metal electrodes 26 a second annular lens 34 which is arranged at a distance equal to its focal length $f_2$ from the energy diaphragm 24 and collimates the ions of energy $eU_o$, that form a divergent hollow beam, into a pencil parallel to the axis $z$. The parallel pencil of ions then enters parellel to the z axis a magnetic analyser 36 in which mass separation takes place. In the magnetic analyser 36 a magnetic field azimuthal to the z axis is generated, e.g. by an arrangement of electromagnets, as shown more accurately in FIG. 2. This arrangement of magnets contains wedge-shaped pole pieces 38 and coils 40 (not shown in FIG. 1). The common intersection line of all the sectional planes in which the lateral surface of the pole pieces lie coincides with the $z$ axis, as shown in FIG. 2 by dotted lines for two pairs of pole pieces. The lines of force of the magnetic field B produced between any two adjacent pole pieces are arcs about the z axis and the field strength is inversely proportional to the distance from the z axis. Such arrangements of magnets are known in principle (see, for example, "Alpha-, Beta- and Gamma-Ray Spectroscopy," 1, page 127; U.S. Pat. No.3,445,650; Federal German Laid-Open Specification 2,031,811).

A magnetic field of the same kind could also be produced in an open-wound iron-free toric coil, whose turns have the same contour as the pole pieces. However, this enables only relatively low field strengths to be obtained, so that only ions of very low energy could be analysed. Under certain circumstances, higher field strengths are obtainable when a superconductive coil is used, provided that the technical difficulties known to occur in such coils are taken into account.

The strength of the magnetic field is, as will be realised by those skilled in the art, variable in a controlled manner. The faces turned towards the energy diaphragm 24, of the pole pieces 38 lies in a plane perpendicular to the z axis. The magnetic field is polarised in such a way that the incoming ions are deflected in the direction of the z axis. The paths of the ions are cycloidal arcs lying in planes passing through the z axis.

In the embodiment shown in FIG. 1 direction focussing of the parallel incoming beam of ions occurs at a circle 42 about the $z$ axis after deflection by 135° has taken place. The circle 42 has radius $r_2 = 0.43\ r_m$ ($r_m$ is the distance of the annular focus 22 from the $z$ axis) and is at a distance $z_2 = 0.38\ r_m$ from the plane 44 which passes through the face of the pole pieces. An exit diaphragm 46 with an annular aperture is arranged at the location of the circle 42. The ions which can pass through the aperture of the exit diaphragm 46 are captured by a collector 48 and detected by a detecting device (e.g. a current-measuring instrument), not shown, which is connected to the collector. A mass spectrum can be recorded in a known manner by varying the strength B of the magnetic field. When the arrangement of magnets shown in FIG. 2 is used, the slit-shaped aperture of the exit diaphragm 46 is interrupted at intervals by the coils 40.

To achieve energy focussing, the energy dispersion caused by the spherical capacitor 18 at the location of the energy diaphragm 24 must be counteracted by the magnetic field B. If ions of energy $eU_o$ leave the spherical condenser parallel to the z axis, then the exit straight lines of ions of energy $e(U_0+\Delta U)$ are inclined to the z axis by the angle $\gamma_e = L_e \Delta U/U_o$, where $L_e$ is the energy-dispersion coefficient of the spherical capacitor 18. The annular lens focusses these ions at the distance.

$$Y_e = \gamma_e f_1 = L_e f_1 \Delta U/U_o \qquad (1)$$

from the centre path.

The analogous energy dispersion of the magnetic field, calculated in reverse, amounts to $$Y_m = N_m (f_2/2) \cdot \Delta U/U_o. \quad (2)$$

where $N_m$ is the momentum-dispersion coefficient of the magnetic field. The condition for energy focussing is $$Y_e = Y_m \quad (3)$$

which yields $$L_e f_1 = N_m f_2/2. \quad (4)$$

The value of $L_e$ is given by $L_e = \sin \phi$; hence, for $\phi = 45°$ the result is $L_e = \sqrt{2}/2$. In the example described the momentum-dispersion coefficient $N_m = 1.325$ is obtained.

Equation (4) therefore yields.

$$f_2 = 1.07 f_1 \quad (5)$$

Figure 3:
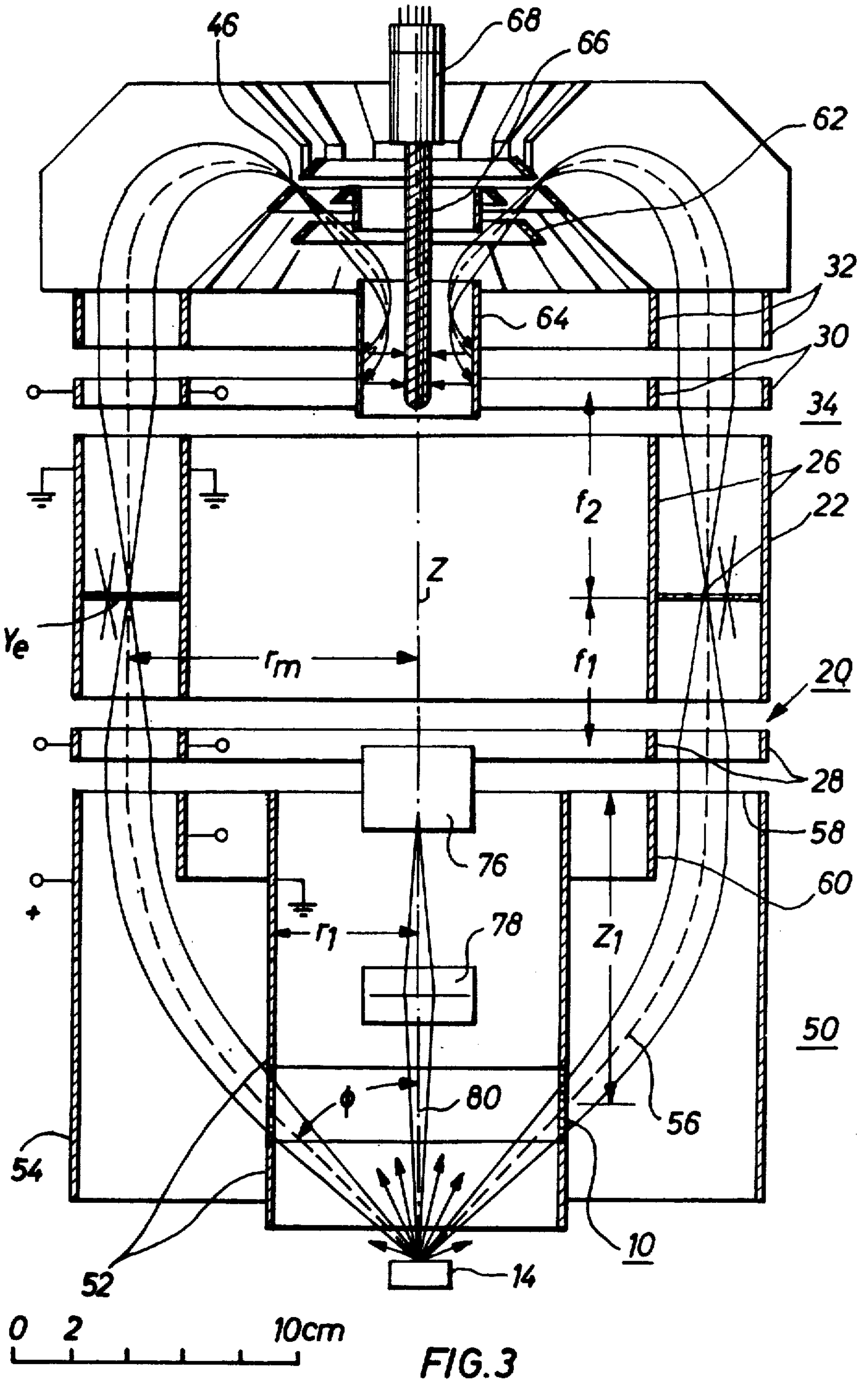
FIG. 3 is a schematic view of a second embodiment of a mass spectrometer according to the invention in axial section.

In the embodiment of the invention shown in FIG. 3 is a bisected cylindrical-mirror analyser 50 (Review of Scientific Instruments, Volume 38, (1967), pages 1,210–1,216) is used as an energy analyser instead of a spherical capacitor. Here, the electrical field is generated between concentric metal cylinders 52 and 54, the first of which is broken to form the entrance diaphragm 10. Such an electrical analyser can be manufactured more simply than a spherical capacitor and the quality of its ion optics is even superior to that of the spherical capacitor if its geometry is correctly chosen. In the example shown in FIG. 3 $\phi = 45°$, the inner metal cylinder has the radius $r_1 = 0.516\ r_m$ and the distance $z_1$ between the circle of penetration of the centre beam 56 and the exit plane of the cylindrical-mirror analyser 50 amounts to $1.08\ r_m$. At the exit end a thin-walled third metal cylinder 60 is arranged concentrically to the other two metal cylinders 52 and 54, is at approximately the same distance from the centre beam 56 as the outer metal cylinder 54 and receives from a voltage source not shown a potential which at this radius would prevail even if said cylinder were not present. As a result, the stray field on the ion exit side is kept small. The energy-dispersion coefficient $L_e$ of the electrical field of such a cylinderical-mirror analyser is 0.855, if after leaving the field the ions are to have the same potential as at the time of entry. If the same magnetic field as in the example of FIG. 1 is used, equation (4) for energy focussing then yields the condition $$f_2 = 1.29 f_1. \quad (6)$$

To the extent that the same reference symbols have been used, the examples of FIGS. 1 and 3 correspond.

FIG. 3 also shows an ion-detecting device which can be used successfully in the other embodiments and for other particle-detection applications. It is distinguished by a very high sensitivity and it operates on the known ion-electron converter principle (Zeitung der Physik, Vol. 145 (1956), page 44), although here it has axially symmetric geometry. After they pass through the annular aperture of the exit diaphragm 46, the ions are accelerated to 10 to 15 keV by a negative voltage at a further annular diaphragm 62, whereupon they enter an electrical field between the inside wall of a metal tube 64, which can consist of aluminium, for example, and a thin metallised rod 66 of scintillator material. The field is polarised in such a way that the ions are repelled by the rod 66 and strike the inside wall of the metal tube 64. At that point they give off secondary electrons which are, in turn, accelerated by the field to the rod 66, where they penetrate the metal coating and produce flashes of light in the scintillator material. By reflection on the metal coating and total reflection on the outside wall of the rod 66, the light produced reaches the upper end of the rod which is optically coupled to a photo-multiplier tube 68.

Figure 4:
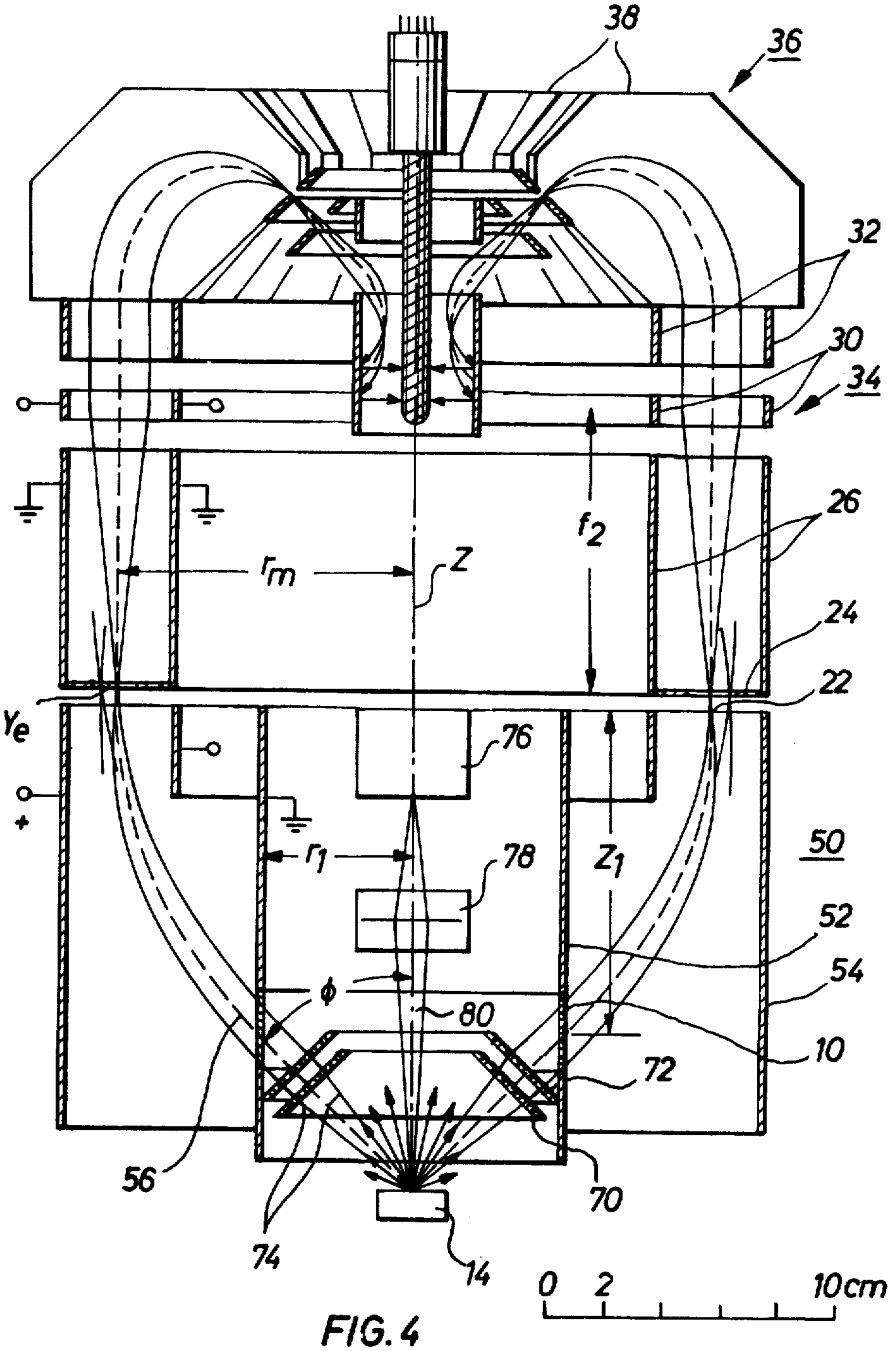
FIG. 4 is a simplified view of a third embodiment of the invention in axial section.

Like the embodiment according to FIG. 3, the embodiment of the invention shown in FIG. 4 contains a cylindrical-mirror analyser 50. In the mass spectrometer according to FIG. 4, however, the ions emerging from the ion source 14 are accelerated, before entering the cylindrical-mirror analyser 50 acting as an energy analyser, over a stage between two grids 70 and 72 curved to form conical surfaces, to an energy $eU_1$ which is high in comparison with the initial energy $eU_o$ of the ions when they emerge from the ion source 14. As a result of this acceleration the lateral paths 74 of ions are refracted towards the centre beam 56, so that they enter the energy analyser approximately parallel to the centre beam. This analyser has the same geometry as in the embodiment according to FIG. 3. However, because of the practically parallel beam entry the direction focus 22 occurs here without the need for an additional annular lens (like the annular lens 20 in FIG. 3). The direction focus lies in the exit plane of the cylindrical-mirror analyser. In a direction focus those ions of equal energy meet which emerge from a point in the ion source 14 in different directions within the angle limited by the entrance diaphragm 10.

In the embodiment according to FIG. 4 the radial energy dispersion is $Y_e = 0.6615\ r_m\ U/U_1$. The condition $$Y_e = Y_m \quad (7)$$

for energy focussing yields here the relation $$f_2 = r_m \quad (8)$$

if a magnetic analyser 36 with the same geometry as in the previous examples is used (hence, with $N_m = 1.325$).

These mass spectrometers are especially suitable for the examination of solid surfaces by ion sputtering. In this application a primary ion source 76 can be arranged in the axis of the mass spectrometer, with a focussing system 78 (e.g. an electrostatic lens) which enables a focussed pencil of primary ions 80 to be fired at the surface under examination. The particles swept from the specimen by the primary ions can, if they are charged, be analysed directly (in this case, the specimen forms the ion source 14) or, if they are neutral, after ionisation by electron impact in the field-free space between the specimen and the entrance diaphragm 10 or the grid 70.

Surface analysis by ion backscatter (see e.g. Surf. Sci. 25 (1971), pages 171–191) may be mentioned as a further possible application of the arrangement, shown in FIGS. 3 and 4, with the primary ion source 76 and the focussing system 78, the mean backscatter angle amounting to 135° in the embodiments shown.

The geometry of the magnetic field, which is explained in FIG. 2 and to which the numerical values given in the various embodiments apply, is not the only solution for the condition of direction focussing. There are further solutions with other angles of deflection in the magnetic field, in which case other values are obtained for $r_2$ and $z_2$ (FIG. 1). There will, however, also be other values for $N_m$ which must be substituted into the conditions for energy focussing in order to yield the correct value for $f_2$.

Instead of the symmetric annular lenses 20 and 34 indicated in the aforesaid embodiment, immersion lenses may also be used, if desired, hence ones in which the potentials before and after a lens are essentially different. To satisfy the energy focussing condition, refraction of the beam by the immersion lenses must be taken into account.

The present mass spectrometer can be used successfully wherever the ions to be detected are emitted from a source volume within a larger solid angle, e.g. a cone with a vertex angle above 30°.

The figures are drawn to scale and represent typical embodiments of the invention. They can be arbitrarily enlarged or reduced within reasonable limits.

The following numerical examples are typical of the embodiments shown.

In the following numerical examples the symbols designate the following:

(U 18) the operating voltage of the outer or inner electrode of the spherical capacitor relative to earth;

(U 28,30) the voltage at the electrodes 28 and 30 to earth with the same potential;

(U*x*) the voltage of the electrode to earth with the reference sign *x*;

*r*(*x*) radius of the electrode with the reference sign *x* relative to the axis *z*.

If the magnetic field has the value 0 Gauss, the ions are, of course, not deflected. However, the power packs normally used to supply the coils 40 generally enable the current to be adjusted between 0 and a maximum value, so that in the numerical examples the value 0 is given as the lower limit for the magnetic field. The mass ranges stated apply to specific masses (ion mass/ion charge). In the numerical example to FIG. 1 and FIG. 3 ions of specific mass 1 (protons) with a magnetic field B of 90 Gauss are focussed on the circle 42 in the plane of the exit diaphragm 46. In the numerical example to FIG. 4 the corresponding value is approximately 200 Gauss.

Application: Analysis of post-ionised sputtered neutral particles.

U(14) = U(70) = + 50V; grid 72 earthed.

U(54) = + 32 V; U(60) = +16.5 V.

U(30) variable from + 15 V to + 30 V (fine adjustment).

Magnetic field variable from 0 to 2,050 Gauss (with distance between axes *rm* = 10 cm); gives a mass range from 1 to 100.

I claim:

1. A double-focussing mass spectrometer having a large entrance aperture to accept ions emitted by an ion source into a solid angle encompassing an axis, the said ions having various ratios of charge to mass; said mass spectrometer comprising an entrance diaphragm having an annular opening through which a diverging beam of said ions enters, said beam having a central ray in each radial section in a plane passing through said axis;

an analyzing system to select ions of a predetermined ratio of charge to mass;

an exit diaphragm having an annular opening through which said selected ions pass to ion detecting means, wherein said annular openings of said entrance and exit diaphragms are essentially coaxial to said axis and said analyzing system includes, along the paths of said ions between said entrance and exit diaphragms in the order named:

a. energy analyzer means for direction focussing ions of equal energy to respective loci corresponding to their respective energies, said energy analyzer means being essentially rotationally symmetrical relative to said axis, further having a predetermined first energy dispersion coefficient, and deflecting the beam of ions entering through said opening of said entrance diaphragm in such a way towards the said axis, that the said central rays of the deflected beam of ions run essentially parallel to said axis;

b. energy diaphragm means, having an annular opening and arranged in the plane of said loci to limit the energy range of the ions transmitted through said annular opening, which opening is essentially coaxial relative to said axis;

Numerical examples

| | $\phi$ | $r_m$ | $f_1$ | $f_2$ | $r_1$ | $z_1$ | $r_2$ | $z_2$ |
|---|---|---|---|---|---|---|---|---|
| FIG. 1 | 45° | 10cm | 7.0cm | 7.5cm | — | — | 4.3cm | 3.8cm |
| FIG. 3 | 45° | 10cm | 5.8cm | 7.5cm | 5.16cm | 10.8cm | 4.3cm | 3.8cm |
| FIG. 4 | 45° | 10cm | — | 10cm | 5.16cm | 10.8cm | 4.3cm | 3.8cm |

The distance between the inner and outer elements of the electrodes 18, 28, 26, 30, 32 amounts to 4.0 cm.

To FIG. 1:

Application: Analysis of secondary ions of mean initial energy $eU_o$=10 eV. Specimen 14 earthed. U(18) = ± 4.0 V.

U(28,30) variable from + 5 V to 10 V (fine adjustment). Magnetic field variable from 0 to 1,300 Gauss (with distance between axes $r_m$ = 10 cm); gives a mass range from 1 to 200.

To FIG. 3:

Application as in FIG. 1. Specimen 14 earthed.

*r*(54) = 12.0 cm; *r*(60) = 8.0 cm.

U(54) = 6.4 V; U(60) = 3.3 V.

To FIG. 4:

c. electrical annular lens means for collimating the ions of equal energies diverging from said loci, said lens being essentially coaxial to said axis and having a predetermined second energy dispersion coefficient; and d. momentum analyzer means for focussing ions with an equal charge-to-mass ratio, which have passed through said opening of said energy diaphragm means to respective further loci lying in a plane which comprises said exit diaphragm, said momentum analyzer being essentially symmetrically to said axis and having a predetermined third energy dispersion coefficient;

said annular lens having a focal length selected such that the energy dispersion resulting from said first energy dispersion coefficient of said energy analyzer means is opposite and equal to the energy dispersion resulting from the combination of said second and third energy dispersions coefficients of said annular lens and said momentum analyzer means.

2. A mass spectrometer as claimed in claim 1, wherein said energy analyser comprises a spherical capacitor (18) which deflects the ions entering the entrance diaphragm (10) divergently on to paths running parallel to the said axis (Z) and a second annular lens (20) which focusses the deflected ions in a set of first loci (22).

3. A mass spectrometer as claimed in claim 1, wherein the energy analyser comprising a cylindrical-mirror analyser (150) having two main electrodes, which is so dimensioned that the ions entering the entrance diaphragm (10) divergently are deflected on to paths running essentially parallel to the said axis and an annular lens (20) which focusses the deflected ions into a set of first loci (22).

4. A mass spectrometer as claimed in claim 3, wherein at an ion exit end of the cylindrical-mirror analyser a coaxial electrode (60), short in an axial direction in comparison to said analyser, is arranged, which is at least approximately aligned with an adjacent lens electrode of said annular lens and is connected to a source for a potential which lies between the potentials of the two main electrodes of the cylindrical-mirror analyser.

5. A mass spectrometer as claimed in claim 1, wherein the energy analyser includes electrodes (70,72) for accelerating the ions emitted by the ion source (14) to an energy ($eU_1$) which is high in comparison to the energy ($eU_0$) of the ions emitted by the ion source and also includes a cylindrical-mirror analyser(50) which comprises two main electrodes and which the accelerated ions enter on approximately parallel paths and which is so dimensioned that it focusses the ions entering in parallel into the first loci (22) in such a way that the center rays (50) run essentially parallel to the axis (FIG. 4).

6. A mass spectrometer as claimed in claim 5, wherein at the ion exit end of the cylindrical-mirror analyser a coaxial electrode, short in an axial direction in comparison to said analyser, is arranged, which is at least approximately aligned with an adjacent lens electrode of said annular lens and is connected to a source for a potential which lies between the potentials of the two main electrodes of the cylindrical-mirror analyser.

7. A mass spectrometer as claimed in claim 1, wherein the annular lens (20 or 34) contains electrodes (26, 28 or 30, 32) in the form of concentric straight circular cylinders.

8. A mass spectrometer as claimed in claim 7, wherein the cylindrical-mirror analyser comprises two main electrodes, is provided at its ion exit with a coaxial electrode, short in an axial direction in comparison to said analyser, which is at least approximately aligned with an adjacent electrode of said electrical annular lens and is connected to a source for a potential which lies between the potentials of the two main electrodes of the cylindrical-mirror analyser.

9. A mass spectrometer as claimed in claim 1, wherein the momentum analyser comprises a plurality of wedge-shaped pole pieces (38) provided with annular coils (40) which produce an azimuthal magnetic field (B, FIG. 2).

10. A mass spectrometer as claimed in claim 1, further including ion-detecting means which comprise an ion accelerator electrode (62), a secondary emission electrode (64) in the form of a hollow cylinder, a rod-shaped scintillator element (66), which is arranged on its axis, coated with a thin conductive layer penetrable by secondary electrons and optically coupled to a photoelectric device (68), and a voltage source whose negative pole is connected to said secondary electrode and whose positive pole is connected to said conductive layer of the scintillator element.

* * * * *